April 8, 1969    J. DIMEFF    3,437,919
CRYOGENIC APPARATUS FOR MEASURING THE INTENSITY
OF MAGNETIC FIELDS
Filed July 1, 1965
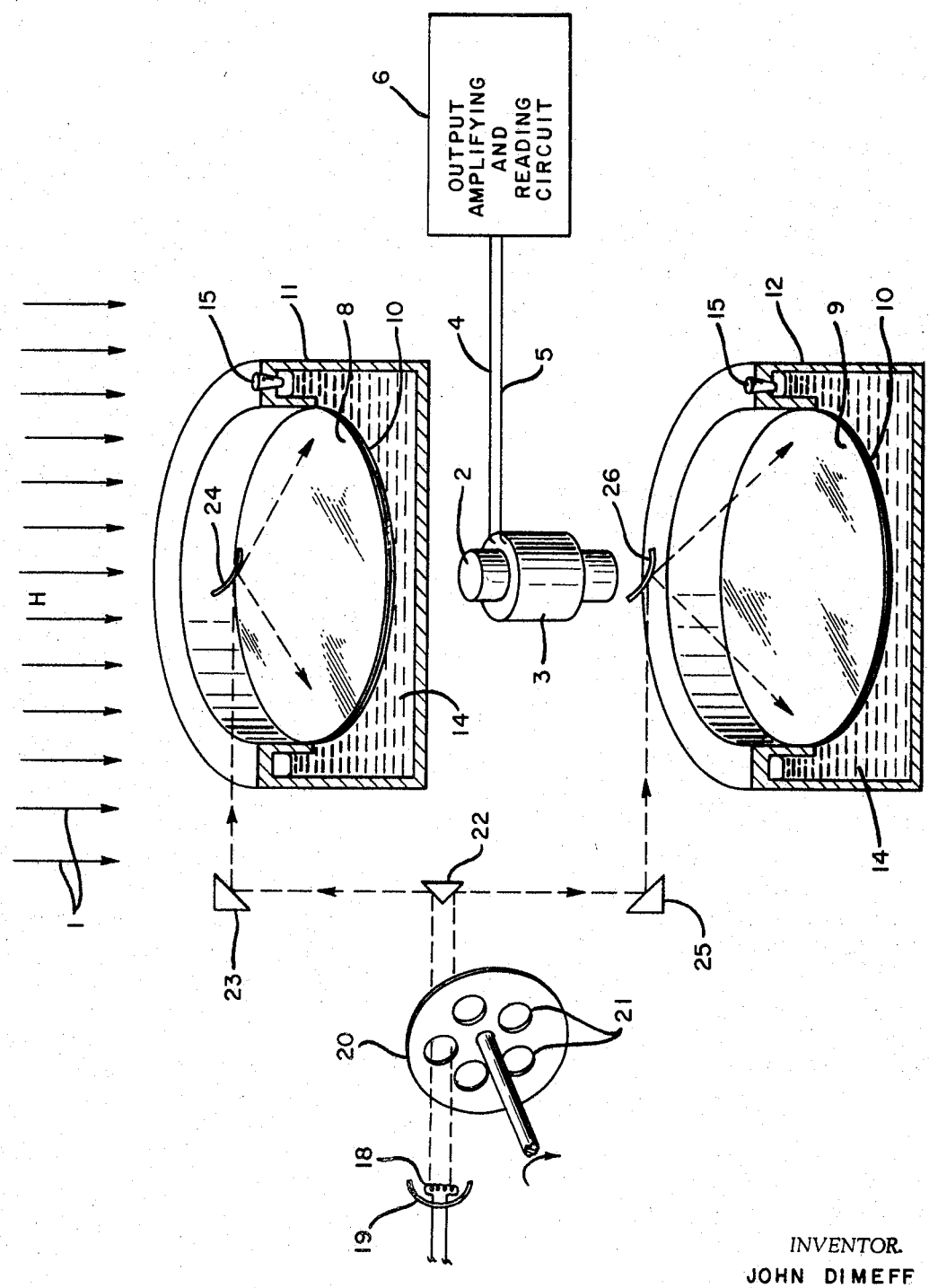
INVENTOR.
JOHN DIMEFF
BY
ATTORNEYS United States Patent Office 3,437,919
Patented Apr. 8, 1969

3,437,919
CRYOGENIC APPARATUS FOR MEASURING THE INTENSITY OF MAGNETIC FIELDS
John Dimeff, San Jose, Calif., assignor to the United States of America as represented by the National Aeronautics and Space Administration
Filed July 1, 1965, Ser. No. 469,013
Int. Cl. G01r 33/02
U.S. Cl. 324—43        3 Claims

ABSTRACT OF THE DISCLOSURE

A cryogenic magnetometer. A sensing coil is positioned between two sheets of superconductive material. The temperature of the sheets is periodically changed above and below the transition temperature of the sheets so that a magnetic field under test is periodically gated. The effects of residual magnetism in the coil core are obviated because the residual field is not gated. The unknown field passing through the sheets is pinched during the gating process increasing the flux density at the coil, and the amplitude of the resultant signal.

---

The invention described herein may be manufactured and used by or for the Government of the United States of America for governmental purposes without the payment of any royalties thereon or therefor.

This invention relates to the measuring of the intensity of magnetic fields, and more particularly to a cryogenic flux-gated magnetometer.

As is well known, a changing magnetic field will generate a current flow in a conducting loop. Thus a sensing coil can be placed in a changing magnetic field, and the current flow generated in the coil will provide a measure of the intensity of the fluctuations. The problem is that the magnetic field will not generate any current flow in the coil under steady state conditions. The relation between the field and the coil must be made to fluctuate before any current will be generated. The historic solution to the problem has been to vary the amount of the flux from the magnetic field which is allowed to pass through the sensing coil. Thus, if the amount of flux through the coil is periodically varied between full strength and some percentage thereof, the changing flux will generate a current flow, which will of course be a measure of the intensity of the magnetic field. The described process of changing the amount of flux which is permitted to pass through the sensing coil is called "flux-gating."

In conventional prior art flux-gated magnetometers, a core of magnetic material is placed in the sensing coil. A second or gating coil is placed around the sensing coil. The gating coil is driven with a sinusoidal current which is of sufficient magnitude to drive the magnetic core to saturation. When the core is periodically saturated by the gating field it experiences a periodic change in permeability relative to the magnetic field to be measured. As a result, the amount of the magnetic field flux passing through the coil is modulated to cause an alternating voltage to appear across the sensing coil.

The described prior art type of flux-gating has enjoyed substantial use as an improvement over measuring techniques employed theretofore. However, the described prior art type of flux-gating does suffer from several disadvantages. For example, since the gating is accomplished by the use of magnetic fields of high intensity (created by the gating coil), there is interference with the measurement of magnetic fields of small intensity. Further, there is no simple convenient means for differentiating between the magnetic field to be measured and those magnetic fields that result from the residual magnetic effects in the magnetic core.

Accordingly, the object of the present invention is to provide an improved method and apparatus for measuring the intensity of magnetic fields, and in particular to avoid the disadvantages of the described prior art flux-gating technique.

By way of brief description the present invention employs superconductive material to accomplish the gating, and thus eliminates the prior art gating coil. As is well known in the art, one of the properties of superconductors is that they prevent the passage of magnetic flux therethrough at temperatures below the transition temperature. When the superconductor is heated above the transition temperature it returns to its normally conductive state and is again permeable to the passage of magnetic flux. The invention utilizes the described characteristic of superconductors to periodically shield and expose the sensing coil to the magnetic field to be measured.

The various objects and features of advantage of the invention will become more apparent from the following detailed description wherein reference is made to the accompanying drawing.

The drawing consists of a single figure which is a schematic showing, partly in perspective and partly in section portraying one embodiment of a cryogenic flux-gated magnetometer according to the invention.

Referring in more detail to the drawing, the arrow lines 1 represent the magnetic field to be measured. The measuring apparatus comprises a core 2 surrounded by a conventional sensing coil 3 made of turns of insulated wire. The core 2 can be either magnetic or non-magnetic material as will be hereinafter explained in more detail.

The two ends of the coil wire can be connected by leads 4 and 5 to a conventional output amplifying and reading circuit 6, such as has been used with prior art flux-gated magnetometers.

The core 2 and the sensing coil 3 are shielded from the magnetic field H by a pair of superconductor disks 8 and 9 made of any of the suitable superconducting materials which are well known in the art. As previously stated, superconductors have a transition temperature below which they have substantially zero magnetic permeability. The transition temperature varies with the particular superconductor material but is normally a very low temperature below about 10° Kelvin. Thus it is necessary to provide some means for cooling the superconductors 8 and 9 below their transition temperature. In the drawing the cooling means is represented schematically by containers 11 and 12 in which the superconductor plates 8 and 9, respectively, form the main upper wall. Each of the plates 8 and 9 is separated from the inner portions of its container by a thin thermally insulating coating 10. The containers 11 and 12 can be filled with a cooling substance such as liquid helium indicated at 14. Plugs such as indicated at 15 can be removed for filling and emptying the containers.

The arrangement thus far described would maintain the superconductors 8 and 9 continuously below the transition temperature and therefore would continuously prevent the flux lines of field H from reaching the core 2 and coil 3. In order to modulate the system and obtain an output from the sensing coil 3, means are provided for thermally pulsing the superconductors 8 and 9 to heat them periodically above the transition temperature. In the drawing the periodic heating means is indicated by a heating filament 18, a beam focusing reflector 19, and means for intermittently transmitting the beam to the superconductors 8 and 9. The intermittent transmitting means is represented schematically by a rotating disk 20 having apertures 21 therein. Obviously, as the disk 20 is rotated, the beam from filament 18 will be allowed to pass each time an aperture 21 comes into registry with the beam, and the beam will be blocked periodically by the disk intermediate the apertures 21. The beam passed by the apertures 21 is divided by a reflecting prism 22. One leg of the beam is turned by a reflecting prism 23 and aimed at a dispersing mirror 24 which spreads the beam onto the surface of the disk 8. Similarly, the other leg of the beam is turned by a reflecting prism 25 and directed onto a dispersing mirror 26 which spreads the beam onto the surface of the disk 9.

The thermal radiant energy in the beam raises the temperature of the superconductors 8 and 9 temporarily above the transition temperature. During the heating period the superconductors do not prevent the passage of the magnetic field and the core 2 and coil 3 are immersed in the field. When the field is thus allowed to cut the coil turns, a voltage will be generated in the sensing coil of a magnitude proportional to the intensity of the field H. When the disks 8 and 9 are shielded from the heating effect of the beam, the disks 8 and 9 will cool through the transition temperature and the core and coil will be again shielded from the magnetic field. Thus, the periodic variations in the magnetic field seen by the sensing coil will cause an A-C voltage to appear across the leads 4 and 5 from the coil. The amplitude of the A-C voltage generated in the sensing coil will be a function of the intensity of the magnetic field H, and the frequency of the voltage will be determined by the gating frequency at which the superconductors are driven through their transition temperature.

Obviously, the use of the described technique does not involve any secondary modulating magnetic field to interfere with the detection of the unknown field H. Further, if the core 2 is made of magnetic material and some residual magnetism exists in the core, the invention makes it possible to substantially eliminate the detrimental effect of such residual magnetism. More specifically, the plates 8 and 9 are conveniently spaced substantially outside the residual magnetic field which passes out of one end of the core 2 and into the other. In this way, driving the superconductors through the transition temperature will cause substantially no change in the residual field. As a result the output from the sensing coil will be essentially a pure function of the unknown field H, substantially independent of any component due to any residual field.

The core 2 can even be of non-magnetic material in accordance with one method for practicing the invention. More specifically, the core can be omitted if the superconductors 8 and 9 are first cooled through the transition temperature along their peripheral edges, thereby trapping all the flux which passes through the plates 8 and 9, and then progressively shrinking the radius of the normally conducting material so as to concentrate the trapped flux within a small aperture coaxial with the sensing coil. Conventional gating means do not have this flux-concentrating effect and therefore conventional magnetometers must employ magnetic cores in order to concentrate the flux through the coil and thus achieve sufficient sensitivity. The arrangement shown in the drawing results in the described action for permitting the use of a non-magnetic core. More specifically, the amount of heat delivered by a source of radiant energy is an inverse function of the square of the distance from the source. The peripheries of the disks 8 and 9 are much further from the mirrors 24 and 26 than are the centers of the disks. Thus, the centers will be heated more than the peripheries during the heating period, and therefore the peripheries will cool first when the disks are shielded from the heat source.

Although specific details of the present invention are shown and described herein it is to be understood that modifications may be made therein without departing from the spirit and scope of the invention as set forth in the appended claims. For example, the superconductor gate could be in other configurations such as cylindrical or spherical with the sensing coil inside. Also, the shielding effect of the superconductor could be modulated mechanically by rotating or otherwise moving the superconductor into and out of shielding relation to the sensing coil. Further, the super conductive shields 8 and 9 can be heated in other ways than by the filament 18. For example, the shields 8 and 9 could be heated periodically by passing an electrical current through a thin normally-conductive film in close thermal proximity to the superconductive film; separated therefrom by a uniform layer of thermally and electrically insulating material, one side of the matrix thus formed being subjected to cooling as described schematically in the device shown in the drawing. Heating of a disk-shaped resistor by the passage of electrical current results in greater heating of the center than the periphery so that this type of heating also permits the use of a non-magnetic core.

Having thus described the invention, what is claimed as new and desired to be secured by Letters Patent is:

1. A magnetometer comprising a sensing coil with a ferromagnetic core, said coil and core having a common longitudinal axis, said coil being sensitive along said axis to magnetic fields to be measured, two sheets of superconductive material, said sheets being positioned normal to said axis with said coil therebetween, said sheets being spaced substantially out of the field produced by the residual magnetism in said core, means for cooling said sheets below their transition temperature whereby a magnetic field to be measured is gated, the residual field is not gated, and a voltage representative of said field to be measured is induced in said coil.

2. A magnetometer comprising a sensing coil, said sensing coil having a longitudinal axis along which it is sensitive to magnetic fields to be measured, two discs of superconductive material, said discs having diameters larger than the diameter of said coil, said discs being positioned normal to said axis with the coil therebetween, the centers of said discs being substantially located on said coil axis, means for cooling said discs below their transition temperature, means for periodically heating said discs above their transition temperature whereby a magnetic field to be measured is periodically shielded from said coil by said discs and a voltage representative of said field is induced in said coil, said means for periodically heating including means for heating the central portions of said discs a higher temperature than the peripheral portions whereby said peripheral portions of said discs are periodically cooled below the transition temperature before said central portions and the flux of the magnetic field passing through the discs is pinched toward the center of the discs increasing the flux density at said coil.

3. A cryogenic magnetometer comprising a sensing coil, said coil having a longitudinal axis along which it is sensitive to magnetic fields to be measured, two discs of superconductive material, said discs being larger than said coil, said discs being located perpendicular to said coil axis with the coil therebetween, the centers of said discs being substantially located on said coil axis, means for cooling said discs below their transition temperature, a radiant heat source and optical means for projecting radiant energy onto said discs to heat them above their transition temperature, means for periodically interrupting said radiant heat projection, said heat source, optical means, and interrupting means periodically producing a temperature gradient outward radially from the center of each of said discs with the higher temperature at the center of each of said discs, whereby the flux of a magnetic field to be measured is periodically concentrated and gated at said sensing coil inducing a voltage in said coil representative of said field to be measured.

References Cited

UNITED STATES PATENTS

| | | | |
|---|---|---|---|
| 2,914,735 | 11/1959 | Young | 335—216 |
| 3,218,547 | 11/1965 | Ling | 324—43 |
| 3,263,149 | 7/1966 | Meiklejohn | 307—88.5 |
| 3,331,041 | 7/1967 | Bogner | 335—216 |
| 2,786,179 | 6/1953 | Arnold | 324—117 |
| 2,973,441 | 9/1959 | Courtney-Pratt | 307—88.5 |
| 3,054,978 | 9/1962 | Schmidlin et al. | 307—88.5 |

RUDOLPH V. ROLINEC, *Primary Examiner.*

A. E. SMITH, *Assistant Examiner.*

U.S. Cl. X.R.

307—245